(12) United States Patent
Passard et al.

(10) Patent No.: US 10,288,905 B2
(45) Date of Patent: May 14, 2019

(54) OPTICAL ARTICLE COMPRISING AN INTERFERENCE COATING WITH HIGH REFLECTIVITY IN THE ULTRAVIOLET REGION

(71) Applicant: ESSILOR INTERNATIONAL (COMPAGNIE-GENERALE D'OPTIQUE), Charenton-le-Pont (FR)

(72) Inventors: Delphine Passard, Charenton-le-Pont (FR); Nicolas Maitre, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/539,037

(22) PCT Filed: Dec. 18, 2015

(86) PCT No.: PCT/FR2015/053656
§ 371 (c)(1),
(2) Date: Jun. 22, 2017

(87) PCT Pub. No.: WO2016/102857
PCT Pub. Date: Jun. 30, 2016

(65) Prior Publication Data
US 2017/0351119 A1    Dec. 7, 2017

(30) Foreign Application Priority Data
Dec. 24, 2014    (FR) ..................................... 14 63344

(51) Int. Cl.
*G02C 7/10*    (2006.01)
*G02B 1/115*    (2015.01)
(Continued)

(52) U.S. Cl.
CPC .............. *G02C 7/107* (2013.01); *G02B 1/115* (2013.01); *G02B 1/116* (2013.01); *G02B 5/26* (2013.01); *G02B 5/283* (2013.01); *G02C 7/104* (2013.01)

(58) Field of Classification Search
CPC .......... G02C 7/022; G02C 7/10; G02C 7/104; G02C 7/107
(Continued)

(56) References Cited

U.S. PATENT DOCUMENTS

| 4,211,823 A | 7/1980 | Suzuki et al. |
| 5,015,523 A | 5/1991 | Kawashima et al. |

(Continued)

FOREIGN PATENT DOCUMENTS

| EP | 0404111 | 12/1990 |
| EP | 0614957 | 9/1994 |

(Continued)

OTHER PUBLICATIONS

Citek et al., "Anti-Reflective coatings reflect ultraviolet radiation", Optometry—Journal of the American Optometric Association, vol. 19, No. 3, (2008), pp. 143-148.

*Primary Examiner* — Darryl J Collins
(74) *Attorney, Agent, or Firm* — Norton Rose Fulbright US LLP

(57) ABSTRACT

The present invention relates to a transparent ophthalmic lens comprising a substrate having a main front face and a main rear face, said main front face being coated with a multilayer interference coating, preferably an anti-reflection coating, comprising a stack of at least one layer have a refractive index greater than 1.6 and at least one layer having a refractive index less than 1.55, characterized in that:
the mean reflection factor on said main front face coated with said interference coating, between 350 nm and a
(Continued)

wavelength between 380 and 400 nm, preferably between 350 and 380 nm, weighted by the function W(I), is greater than or equal to 35% for at least one angle of incidence between 0° and 17°;

the light reflection factor at 400 nm on said main front face coated with said interference coating is less than or equal to 35% for at least one angle of incidence between 0° and 17°.

26 Claims, 1 Drawing Sheet

(51) Int. Cl.
    *G02B 1/116*     (2015.01)
    *G02B 5/26*     (2006.01)
    *G02B 5/28*     (2006.01)

(58) Field of Classification Search
    USPC ............ 351/159.48, 159.49, 159.62, 159.6, 351/159.65
    See application file for complete search history.

(56) References Cited

U.S. PATENT DOCUMENTS

| | | |
|---|---|---|
| 5,081,192 A | 1/1992 | Tatemoto |
| 5,316,791 A | 5/1994 | Farber et al. |
| 5,332,618 A | 7/1994 | Austin |
| 5,763,061 A | 6/1998 | Ochiai et al. |
| 5,922,787 A | 7/1999 | Kondo et al. |
| 6,183,872 B1 | 2/2001 | Tanaka et al. |
| 6,277,485 B1 | 8/2001 | Invie et al. |
| 6,337,235 B1 | 1/2002 | Miyanaga et al. |
| 2013/0293950 A1 | 11/2013 | Wei |
| 2014/0008543 A1* | 1/2014 | Citek ..................... G02C 7/028 250/372 |
| 2014/0078589 A1* | 3/2014 | Fujii ..................... G02B 1/115 359/601 |
| 2017/0075040 A1* | 3/2017 | Bolshakov ............ G02B 1/116 |

FOREIGN PATENT DOCUMENTS

| | | |
|---|---|---|
| EP | 0680492 | 4/1997 |
| EP | 0933377 | 8/1999 |
| EP | 1085348 | 3/2001 |
| EP | 2607884 | 6/2013 |
| FR | 2702486 | 9/1994 |
| FR | 2990774 | 11/2013 |
| JP | S6387223 | 4/1988 |
| JP | S63141001 | 6/1988 |
| JP | H01230003 | 9/1989 |
| WO | WO 2013/171435 | 11/2013 |
| WO | WO 2014/057226 | 4/2014 |

\* cited by examiner

OPTICAL ARTICLE COMPRISING AN INTERFERENCE COATING WITH HIGH REFLECTIVITY IN THE ULTRAVIOLET REGION

CROSS-REFERENCE TO RELATED APPLICATIONS

This application is a national phase application under 35 U.S.C. § 371 of International Application No. PCT/FR2015/053656 filed 18 Dec. 2015, which claims priority to French Patent Application No. 1463344 filed 24 Dec. 2014. The entire contents of each of the above-referenced disclosures is specifically incorporated by reference herein without disclaimer.

TECHNICAL FIELD OF THE INVENTION

The present invention generally relates to an article, in particular a transparent optical article, such as an ophthalmic lens, comprising an interference stack allowing the transmission of ultraviolet light through an ophthalmic lens to be decreased.

PRIOR ART

The solar spectrum is composed of electromagnetic radiation of various wavelengths and in particular of ultraviolet (UV) rays. The UV spectrum includes a number of bands, in particular the UVA, UVB and UVC bands. Among the UV bands that reach the surface of the Earth, the UVA band, comprised between 315 nm and 380 nm, and the UVB band, comprised between 280 nm and 315 nm, are particularly harmful to the eye. These bands are in particular responsible for accelerated ocular aging, which can lead to early cataracts or even to more extreme phenomena such as photokeratitis or "snow blindness". The UV protection level of an ophthalmic lens is considered to be inadequate when the ophthalmic lens lets pass more than 1% of wavelengths between 280 nm and 380 nm.

However, certain of the materials commonly used as ophthalmic lens substrates, for example the materials obtained by (co)polymerization of di(ethylene glycol) bis (allyl carbonate) (such materials for example being sold under the trade name CR-39® by the company PPG Industries (ESSILOR ORMA® lenses)) let some of the ultraviolet light between 350 nm to 380 nm pass. Specifically, it has been observed that this type of substrate lets pass some of the UV in this wavelength range.

Therefore, these materials do not provide perfect protection from the harmful ultraviolet light between 280 and 380 nm. This leads to two major problems: firstly ophthalmic lenses made from these materials have a low ESPF (acronym of "Eye-Sun Protection Factor", such as defined in European patent application EP2607884) of about 10/15, and secondly substrates made from these materials yellow over time due to degradation caused by this UV.

Conventional antireflection coatings are designed and optimized to decrease reflection at the surface of the glass in the visible domain, typically in the spectral range extending from 380 to 780 nm. In general, reflection in the UV domain (280-380 nm) is not optimized.

In order to prevent the ocular damage caused by these UV rays and obtain a lens having a UV cut-off (the longest wavelength at which the lens blocks at least 99% of the UV light) higher than or equal to 365 nm and generally equal to 380 nm, various solutions have been proposed in the prior art.

A first solution consists in decreasing reflection in the UV spectrum by coating the back face of a lens substrate with a multilayer antireflection coating.

Document FR 2968774 for example describes a lens substrate comprising on its back face a multilayer antireflection coating. This multilayer antireflection coating has an average reflectance Ruv between 280 and 380 nm, weighted by the function $W(\lambda)$ defined in standard ISO 13666:1998, lower than 5%, at an angle of incidence of 30° and at an angle of incidence of 45°.

For example, example 1 of this document discloses use of an antireflection coating comprising, starting from the substrate, a stack of 4 layers of high ($ZrO_2$) to low ($SiO_2$) refractive index. The reflectance in the UV of this example at an angle of incidence of 35° is: $R_{UV}^{35°}(\%)=4\%$. The coating tested in this example furthermore allows, depending on the tested substrate, an ESPF ranging from 11 to 25 to be obtained, as table 1 below shows:

TABLE 1

| The ESPF value of the stack of example 1 depending on the substrate | | | | | |
|---|---|---|---|---|---|
| Substrate | Orma ® 15 | Orma ® thin | PC | MR7 ® | MR8 ® |
| $T_{UV}^{0°}(\%)$ | 3.87% | 5.26% | 0 | 0 | 0 |
| ESPF-value and class | 13 Class 10 | 11 Class 10 | 25 Class 25 | 25 Class 25 | 25 Class 25 |

Thus, this table shows that ESPF value was lower with Orma® lenses based on di(ethylene glycol) bis(allyl carbonate) than with other substrates, this confirming that Orma® substrates transmit UV of between 350 nm and 380 nm. The Orma Thin® substrate, which has a smaller center thickness and which therefore lets even more harmful UV rays pass, had an even lower ESPF value.

Therefore, depending on the substrate, the ESPF of the ophthalmic lens described in document FR 2968774 is unsatisfactory.

Another solution allowing a UV-blocking ophthalmic lens to be obtained is to decrease transmission in the UV ($T_{UV}^{0°}$ (%)), for example by integrating UV absorbers into the ophthalmic lens.

The UV absorber may be incorporated into the bulk of the lens, during the polymerization of the monomers forming the material of the lens, or be placed on the surface of the latter, by dipping the lens into (or imbibing the lens in) a bath containing the UV absorber.

Incorporation of a UV absorber into a lens is generally accompanied by an undesirable yellowing of the latter, which may be overcome by combining the UV absorber with a specific dye.

Patent application EP 1 085 348 discloses a process for incorporating a UV absorber into a lens without yellowing the latter. This process consists in mixing a benzotriazole-based UV absorber with a di(ethylene glycol) bis(allyl carbonate) or episulfide monomer, which is subsequently polymerized in order to form the material of the lens. The use of this specific UV absorber in this particular process allows long-wavelength UV radiation to be absorbed.

In addition, there has been suggested, in patent application JP01-230003, a process for imbibing a lens using another benzotriazole derivative, 2-(2-hydroxy-5-methylphenyl)benzotriazole.

However, although these solutions using UV absorbers are satisfactory, they implement a quite complex process.

Another known prior-art solution allowing transmission $T_{UV}^{0°}$(%) to be decreased consists in coating the substrate with an antireflection stack that rejects ultraviolet rays.

Document U.S. Pat. No. 5,332,618 for example describes a UV-rejecting multilayer antireflection coating able to be deposited on a transparent (mineral glass) substrate. This coating comprises at least eight layers. It is formed by an alternation, from the substrate, of high-refractive-index layers (refractive index higher than or equal to 2.10 at a wavelength of 520 nm) and of low-reflective-index layers (refractive index of less than 1.50 at a wavelength of 520 nm). In particular, a set of five successive layers, each of the layers being ¼ of a wavelength thick, is flanked by two low-refractive-index layers that are each ⅛ of a wavelength thick, at a wavelength of 330 nm. It is indicated that the reflection of the UV is improved by the constraints on the thickness of these two low-refractive-index layers.

Example 3 of this document illustrates a coating comprising an alternation of eight layers of high-refractive index (made of $TiO_2$) and of low-refractive-index layers (made of $SiO_2$). The optical article according to this example, which has been reproduced by the Applicant, has a reflectance at 400 nm of 46% at an angle of incidence of 0° and a reflectance in the UV of 86% for a wavelength range extending from 350 to 380 nm. Therefore, the coating according to this example has the effect of blocking visible light in the blue, leading to an undesirable yellowing of the optical article.

This document furthermore discloses that a high-refractive-index layer made of zirconia ($ZrO_2$) is not recommended because it would lead to less effective and/or more complex coatings.

Therefore, although these solutions are satisfactory, there is still a need for new optical articles, such as ophthalmic lenses, that, while providing a very good antireflection performance in the visible domain, have improved anti-UV properties and are simple to produce.

Moreover, polycarbonate-based substrates filter at least 99% of light of wavelengths shorter than 385 nm, whereas substrates made of poly(thiourethane)s filter at least 99% of light of wavelength shorter than 395-398 nm. In this violet range of visible light from 380 nm to 400 nm, it may also be advantageous to limit transmission through ophthalmic lenses.

Thus, the aim of the present invention is to provide a new optical article, in particular an ophthalmic article, that avoids all or some of the aforementioned drawbacks.

In particular, the objective of the present invention is to provide a transparent optical article, in particular an ophthalmic lens, that comprises a substrate made of mineral or organic glass including, on its front face, an anti-UV, and preferably antireflection, multilayer interference coating providing a very good antireflection performance in the visible domain and capable, at the same time, of significantly decreasing, relative to a bare substrate or a substrate including a conventional antireflection coating, the transmission of UV rays, and in particular of UVA and UVB rays, and that it is easy to produce industrially.

SUMMARY OF THE INVENTION

The present invention relates to a transparent ophthalmic lens comprising a substrate having a front main face and a back main face, said front main face being coated with a, preferably antireflection, multilayer interference coating comprising a stack of at least one layer having a refractive index higher than 1.6, called the high-refractive-index layer, and of at least one layer having a refractive index lower than 1.55, called the low-refractive-index layer, characterized in that:

the average reflectance of said coated front main face of said interference coating, between 350 nm and a wavelength comprised between 380 and 400 nm and preferably between 350 and 380 nm, weighted by the function $W(\lambda)$, is higher than or equal to 35% at at least one angle of incidence comprised between 0° and 17°; and the light reflectance at 400 nm of said coated front main face of said interference coating is lower than or equal to 35% at at least one angle of incidence comprised between 0° and 17°.

In the context of the invention, the angle of incidence is defined in the conventional way as the angle between the normal to the surface at the point of incidence and the direction of the light beam striking said surface.

The present invention also relates to a process for manufacturing an ophthalmic lens such as defined above, characterized in that the multilayer interference coating is vacuum deposited.

In the rest of the description, unless otherwise specified, the indication of a range of values "from X to Y" or "between X and Y" will be understood, in the present invention, as including the values X and Y.

In the present patent application, when an optical article (or ophthalmic lens) comprises one or more coatings on its surface, the expression "to deposit a layer or a coating on the article" means that a layer or a coating is deposited on the uncovered (exposed) surface of the external coating of the article, that is to say the coating furthest from the substrate.

A coating that is "on" a substrate or that has been deposited "on" a substrate is defined as a coating that (i) is positioned above the substrate, (ii) does not necessarily make contact with the substrate, i.e. one or more intermediate coatings may be arranged between the substrate and the coating in question, and (iii) does not necessarily completely cover the substrate.

In one preferred embodiment, the coating on a substrate or deposited on a substrate makes direct contact with said substrate.

When "a layer 1 is located under a layer 2", it will be understood that the layer 2 is further from the substrate than the layer 1.

By back (or internal) face of the substrate, what is meant is the face which, when the optical article (or ophthalmic lens) is being used, is closest to the eye of the user. This is generally a concave face. In contrast, by front face of the substrate, what is meant is the face which, when the optical article (or ophthalmic lens) is being used, is furthest from the eye of the user. This is generally a convex face.

DESCRIPTION OF THE FIGURES

The invention will be described in more detail with reference to the following appended drawings, in which.

DETAILED DESCRIPTION OF THE INVENTION

Figure 1:
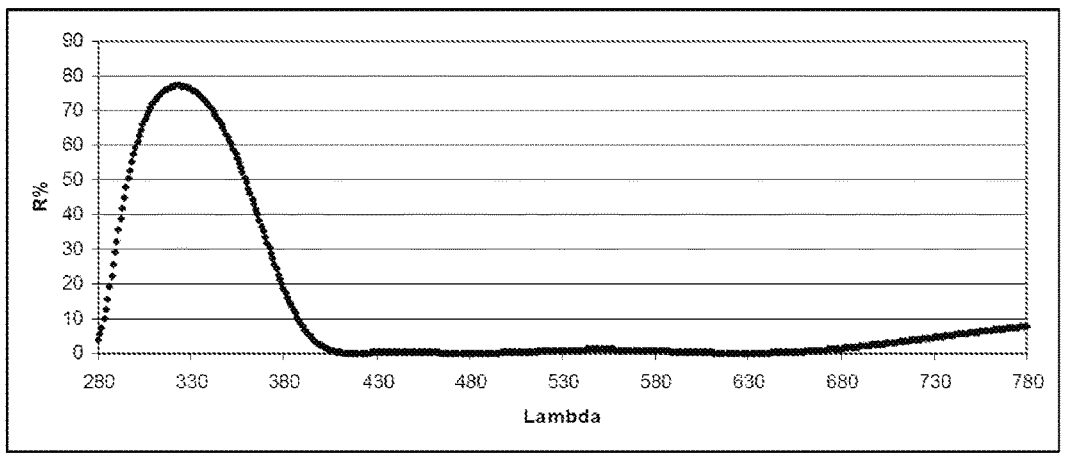
FIG. 1 and FIG. 2 show graphs illustrating the variation in the reflectance R in percent (R %) of optical articles (lens 1 and lens 3, respectively) that are according to the invention, prepared according to example 1 and example 3, respectively, and that each comprise an antireflection coating on their front main face, at an angle of incidence θ of 0° and as a function of wavelength (lambda) in the UVA (315 to 380 nm), UVB (280 to 315 nm) and visible (380 to 780 nm) domains.

The Applicant has sought to develop a new ophthalmic lens comprising a new, preferably antireflection, multilayer interference stack, the front (convex) face of which has a high reflectance measured at an angle of incidence close to normal, in the ultraviolet domain.

The Applicant has shown that the new multilayer interference stack according to the invention allows, surprisingly, the amount of UV passing through substrates, and in particular Orma® substrates, to be decreased, without however reflecting visible light and without causing yellowing of the lens.

The Applicant has also shown that the new multilayer interference stack according to the invention allows ESPF to be greatly increased, without however increasing reflectance in the visible.

Lastly, the method for producing this new anti-UV multilayer interference stack is easy to implement. In particular, it is easier to implement than the UV absorbers that must be incorporated into the substrate. In addition, the required materials are the same as those required for standard antireflection coatings.

Thus, the present invention relates to a transparent ophthalmic lens comprising a substrate having a front main face and a back main face, said front main face being coated with a, preferably antireflection, multilayer interference coating comprising a stack of at least one layer having a refractive index higher than 1.6, called the high-refractive-index layer, and of at least one layer having a refractive index lower than 1.55, called the low-refractive-index layer, characterized in that:
  the average reflectance of said coated front main face of said interference coating, between 350 nm and a wavelength comprised between 380 and 400 nm and preferably between 350 and 380 nm, weighted by the function $W(\lambda)$, is higher than or equal to 35% at at least one angle of incidence comprised between 0° and 17°; and
  the light reflectance at 400 nm of said coated front main face of said interference coating is lower than or equal to 35% at at least one angle of incidence comprised between 0° and 17°.

Specifically, the present invention proposes an anti-UV multilayer interference coating with an improved design, including a stack of thin layers the thicknesses and materials of which have been chosen so as to optimize the antireflection performance in the visible domain on the one hand and in the UV domain on the other.

This optimization of antireflection performance was achieved by taking into account the weighting function $W(\lambda)$ defined in standard ISO 13666:1998, which expresses the distribution of UV solar radiation weighted by the wearer's spectral sensitivity to this radiation. In the wavelength range from 280 nm to 380 nm, the average reflectance corresponds to the factor Ruv well known to those skilled in the art.

In order to take account of violet visible light in the 380 nm to 400 nm range, the weighting function $W(\lambda)$ has been extrapolated to 400 nm, defining an analogue to Ruv extended to violet and ultraviolet light.

Unexpectedly, the inventors have developed an anti-UV multilayer interference coating having a high reflectance in the UV, leading to a decrease in UV transmission, the first consequence of which is to allow ESPF to be increased. A second consequence of this decrease in the amount of UV transmitted to the substrate is that the latter is "protected" and therefore its degradation and consequently the increase in its yellow index over time is limited.

The multilayer interference coatings according to the invention therefore have, without affecting the wearer, a higher spectral reflectance between 280 and 380 nm, in order to achieve the best compromise between antireflection performance in the visible domain and in the UV domain Generally, the multilayer interference coating of the ophthalmic lens according to the invention, which will be referred to as the "UV-reflecting interference coating", may be deposited on any substrate, but will preferably be deposited on substrates made of organic glass, for example of thermoplastic or thermoset.

Regarding thermoplastics suitable for the substrates, mention may be made of (meth)acrylic (co)polymers, in particular polymethyl methacrylate (PMMA), thio(meth)acrylic (co)polymers, polyvinyl butyral (PVB), polycarbonates (PC), polyesters such as polyethylene terephthalate (PET) or polybutylene terephthalate (PBT), polycarbonate/polyester copolymers, cyclic olefin copolymers such as ethylene/norbornene or ethylene/cyclopentadiene copolymers and their blends, and vinyl acetate/ethylene thermoplastic copolymers.

Regarding thermosets suitable for the substrates, mention may be made of the polyurethanes (PU), the poly(thiourethane)s, polyol(allyl carbonate) (co)polymers, the polyepisulfides, and the polyepoxides.

Other thermosets suitable for the substrates are acrylic (co)polymers the refractive index of which is comprised between 1.5 and 1.65 and typically close to 1.6. These acrylic (co)polymers are obtained by polymerization of blends of (meth)acrylate monomers and optionally aromatic vinyl and/or allyl monomers.

These (meth)acrylate monomers may be monofunctional or multifunctional and typically bear 2 to 6 (meth)acrylate groups. These monomers may be aliphatic, cyclic, aromatic, polyalkoxylated, derivatives of compounds such as bisphenol and/or bearing other functions such as epoxy, thioepoxy, hydroxyl, thiol, sulfide, carbonate, urethane and/or isocyanate functions.

The term "(co)polymer" is understood to mean a copolymer or a polymer. The term "(meth)acrylate" is understood to mean an acrylate or a methacrylate. The term "polycarbonate (PC)" is understood in the context of the present invention to mean both homopolycarbonates and copolycarbonates and sequenced copolycarbonates. The substrates may be obtained by polymerization of blends of the above monomers, or may even comprise blends of these polymers and (co)polymers.

Preferably, the substrate according to the invention has a transmittance T higher than or equal to 1% at a wavelength located between 350 nm and 400 nm.

Substrates obtained by (co)polymerization of the di(ethylene glycol) bis(allyl carbonate) sold, for example, under the trade name CR-39® by PPG Industries (ESSILOR ORMA® lenses), or acrylic substrates are particularly recommended.

In particular, the substrate recommended for the invention is the substrate obtained by (co-)polymerization of di(ethylene glycol) bis(allyl carbonate) (CR-39® ESSILOR ORMA® lenses).

Before the UV-reflecting interference coating is deposited on the substrate, which is optionally coated, for example with an anti-abrasion and/or anti-scratch layer or an underlayer, it is common to subject the surface of said optionally coated substrate to a physical or chemical activation treatment intended to increase the adhesion of the UV-reflecting interference coating. This pre-treatment is generally carried out under vacuum. It may be a question of a bombardment with energetic species, for example an ion beam (ion pre-cleaning or IPC), a corona discharge treatment, a glow discharge treatment, a UV treatment or treatment in a vacuum plasma, generally an oxygen or argon plasma. It may also be a question of an acidic or basic surface treatment and/or a treatment with solvents (water or organic solvent(s)).

In the present invention, the average light reflectance, denoted Rv, is such as defined in standard ISO 13666:1998, and is measured according to standard ISO 8980-4 (at an angle of incidence smaller than 17°, typically 15°), i.e. it is a question of the weighted average of the spectral reflectance over all of the visible spectrum between 380 nm and 780 nm. Preferably, the reflectance in the visible Rv between 380 nm and 780 nm of said coated front main face of said UV-reflecting interference coating is lower than or equal to 3% and preferably lower than or equal to 1.5%.

Preferably, the light reflectance at 400 nm of said coated front main face of said UV-reflecting interference coating is lower than or equal to 25% and preferably lower than or equal to 15% at at least one angle of incidence comprised between 0° and 17°.

According to the invention, the average reflectance between 280 and 380 nm, weighted by the function $W(\lambda)$ defined in standard ISO 13666:1998 and denoted Ruv, is defined by:

$$R_{UV} = \frac{\int_{280}^{380} W(\lambda) \cdot R(\lambda) \, d\lambda}{\int_{280}^{380} W(\lambda) \, d\lambda}$$

where $R(\lambda)$ designates the spectral reflectance of the glass at the wavelength in question, and $W(\lambda)$ designates a weighting function equal to the product of the solar spectral irradiance $Es(\lambda)$ and the relative spectral sensitivity function $S(\lambda)$ (referred to as the relative spectral effectiveness function in standard ISO 13666:1998).

By analogy, the average reflectance weighted by the function $W(\lambda)$ may be defined between two wavelengths $\lambda 1$ and $\lambda 2$ if the equation above is rewritten and the limits of the integral set equal to the wavelengths $\lambda 1$ and $\lambda 2$.

The spectral function $W(\lambda)$, which allows average transmittances to be calculated for UV rays, is defined in standard ISO 13666:1998. It allows the distribution of solar UV rays moderated by the relative spectral sensitivity of a wearer to this radiation to be expressed, since it takes into account both the spectral energy of the sun $Es(\lambda)$, which on the whole emits little UVB with respect to the UVA, and the spectral sensitivity $S(\lambda)$, the UVB being more harmful than the UVA. This function has in the context of the invention been extrapolated to violet visible light of 385 to 400 nm. The values of these three functions in the UV domain are indicated in table 2 below (the bold texted cells are extrapolated)

TABLE 2

| | $Es(\lambda)$ (mW/m$^2$ · nm) | $S(\lambda)$ | $W(\lambda) = Es(\lambda) \cdot S(\lambda)$ |
|---|---|---|---|
| 280 | 0 | 0.88 | 0 |
| 285 | 0 | 0.77 | 0 |
| 290 | 0 | 0.64 | 0 |
| 295 | 2.09 × 10$^{-4}$ | 0.54 | 0.00011 |
| 300 | 8.10 × 10$^{-2}$ | 0.30 | 0.0243 |
| 305 | 1.91 | 0.060 | 0.115 |
| 310 | 11.0 | 0.015 | 0.165 |
| 315 | 30.0 | 0.003 | 0.09 |
| 320 | 54.0 | 0.0010 | 0.054 |
| 325 | 79.2 | 0.00050 | 0.04 |
| 330 | 101 | 0.00041 | 0.041 |
| 335 | 128 | 0.00034 | 0.044 |
| 340 | 151 | 0.00028 | 0.042 |
| 345 | 170 | 0.00024 | 0.041 |
| 350 | 188 | 0.00020 | 0.038 |
| 355 | 210 | 0.00016 | 0.034 |
| 360 | 233 | 0.00013 | 0.03 |
| 365 | 253 | 0.00011 | 0.028 |
| 370 | 279 | 0.000093 | 0.026 |
| 375 | 306 | 0.000077 | 0.024 |
| 380 | 336 | 0.000064 | 0.022 |
| 385 | | | 0.02 |
| 390 | | | 0.018 |
| 395 | | | 0.016 |
| 400 | | | 0.014 |

It should be noted that the weighting function $W(\lambda)$ is zero or almost zero between 280 nm and 295 nm, this meaning that the weighted average reflectance is also zero in this wavelength range. This means that even if the reflectance level is high in this spectral range, it will have no effect on the value of the weighted average reflectance Ruv calculated between 280 and 380 nm According to the invention, the UV-reflecting interference coating deposited on the front main face of the substrate preferably has an average reflectance from said front main face between 350 nm and a wavelength comprised between 380 and 400 nm, weighted by the function $W(\lambda)$, higher than or equal to 50% and preferably higher than or equal to 65% at at least one angle of incidence comprised between 0° and 17°.

According to one feature of the invention, the color coordinates of the UV-reflecting interference coating of the invention in the CIE L*a*b* color space are calculated between 380 and 780 nm using illuminant D65 and a 10° observer.

The UV-reflecting interference coatings produced are not limited with regard to their hue angle. However, the hue angle h preferably ranges from 90° to 180° and preferably from 120° to 150°, this producing a coating having a green reflection, and the chroma C* is in general lower than or equal to 15 and better still lower than or equal to 10 at at least one angle of incidence comprised between 0° and 17°.

The, preferably antireflection, UV-reflecting interference coating of the invention comprises a stack of at least one high-refractive-index layer and at least one low-refractive-index layer. Better still, it comprises at least two layers of low refractive index (LI) and at least two layers of high refractive index (HI). It is a question of a simple stack, because the total number of layers of the UV-reflecting interference coating is higher than or equal to 3 and preferably higher than or equal to 4.

In particular, the UV-reflecting interference coating of the invention comprises a number of layers higher than or equal to 3, preferably higher than or equal to 4 and ideally higher than or equal to 6, and a number of layers lower than or equal to 10 and preferably lower than or equal to 8.

A layer of the UV-reflecting interference coating is defined as having a thickness larger than or equal to 1 nm. Thus, any layer having a thickness smaller than 1 nm will not be counted in the number of layers of the UV-reflecting interference coating.

Unless otherwise indicated, all the thicknesses disclosed in the present patent application are physical thicknesses.

It is not necessary for the HI and LI layers to alternate in the stack, although they can be alternating according to one embodiment of the invention. Two (or more) HI layers can be deposited on one another, just as two (or more) LI layers can be deposited on one another.

In the present patent application, a layer of the, preferably antireflection, UV-reflecting interference coating is said to be a high-refractive-index (HI) layer when its refractive index is higher than 1.6, preferably higher than or equal to 1.65, more preferably higher than or equal to 1.7, even more preferably higher than or equal to 1.8 and even better still higher than or equal to 1.9. A layer of the, preferably antireflection, UV-reflecting interference coating is said to be a low-refractive-index (LI) layer when its refractive index is lower than 1.55, preferably lower than or equal to 1.48 and better still lower than or equal to 1.47.

Unless otherwise indicated, the refractive indices to which reference is made in the present application are expressed at 25° C. for a wavelength of 550 nm.

The HI layers are conventional high-refractive-index layers, well known in the art. They generally contain one or more mineral oxides such as, nonlimitingly, zirconia ($ZrO_2$), titanium oxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), $La_2O_{3i}$, $Nb_2O_{5i}$, or $Y_2O_3$. Optionally the high-index layers may also contain silica or other low-refractive-index materials, provided that their refractive index is higher than 1.6 as indicated above. Preferred materials are $TiO_2$, $PrTiO_3$, $ZrO_2$, $Ta_2O_5$, $Al_2O_3$, $Y_2O_3$ and their mixtures.

Preferably, the one or more HI layers are made of zirconia ($ZrO_2$).

The LI layers are also well-known low-refractive-index layers and may comprise, nonlimitingly: silicon oxide, or else a mixture of silica and alumina, in particular silica doped with alumina, the latter contributing to increase the thermal resistance of the UV-reflecting interference coating. Each LI layer is preferably a layer comprising at least 80% by weight silica and better still at least 90% by weight silica, relative to the total weight of the layer, and even better still consists of a silica layer.

Optionally, the low-index layers may also contain high-refractive-index materials, provided that the refractive index of the resulting layer is lower than 1.55.

When a LI layer comprising a mixture of $SiO_2$ and $Al_2O_3$ is used, it preferably comprises from 1% to 10% by weight, better still from 1% to 8% by weight and even better still from 1% to 5% by weight of $Al_2O_3$, with respect to the total weight of $SiO_2+Al_2O_3$ in this layer.

For example, $SiO_2$ doped with 4% or less $Al_2O_3$ by weight, or $SiO_2$ doped with 8% $Al_2O_3$ may be employed. Commercially available $SiO_2/Al_2O_3$ mixtures may be used, such as the LIMA® mixture sold by Umicore Materials AG (refractive index comprised between n=1.48-1.50 to 550 nm) or the substance L5® sold by Merck KGaA (refractive index n=1.48 to 500 nm).

The external layer of the UV-reflecting antireflection coating is in general a layer based on silica, preferably comprising at least 80% by weight silica and better still at least 90% by weight silica (for example a layer of silica doped with alumina) relative to the total weight of the layer, and even better still consists of a silica layer.

Generally, the HI layers have a physical thickness ranging from 10 nm to 120 nm and the LI layers have a physical thickness ranging from 10 nm to 100 nm.

Generally, the total thickness of the UV-reflecting interference coating is smaller than 1 micrometer, preferably smaller than or equal to 800 nm, better still smaller than or equal to 500 nm and even better still smaller than or equal to 250 nm. The total thickness of the UV-reflecting interference coating is generally greater than 100 nm, preferably greater than 150 nm.

According to one preferred embodiment, the UV-reflecting interference coating according to the invention does not contain titanium.

According to one embodiment of the invention, the, preferably antireflection, UV-reflecting interference coating is deposited on an underlayer. This underlayer is considered not to form part of the UV-reflecting interference coating.

The expression "underlayer of the UV-reflecting interference coating" is understood to mean a coating of relatively large thickness used with the aim of improving mechanical properties such as the resistance of said coating to abrasion and/or scratches and/or to promote its adhesion to the substrate or to the subjacent coating.

On account of its relatively large thickness, the underlayer generally does not participate in the antireflective optical activity, in particular in the case where it possesses a refractive index similar to that of the underlying coating (which is generally an anti-abrasion and anti-scratch coating) or that of the substrate when the underlayer is deposited directly on the substrate. Therefore, the underlayer, when it is present, is not considered to form part of the UV-reflecting interference coating.

The underlayer must be thick enough to increase the resistance of the UV-reflecting interference coating to abrasion, but preferably not too thick in order not to absorb light as, depending on the nature of the underlayer, this could significantly decrease the relative transmittance $\tau_v$. Its thickness is generally smaller than 300 nm and better still 200 nm and is generally larger than 90 nm and better still 100 nm.

The underlayer preferably comprises a layer based on $SiO_2$, this layer preferably comprising at least 80% by weight silica and better still at least 90% by weight silica relative to the total weight of the layer, and even better still this layer consists of a silica layer. The thickness of this silica-based layer is generally smaller than 300 nm and better still 200 nm and is generally larger than 90 nm and better still 100 nm.

According to another embodiment, this $SiO_2$-based layer is a layer of silica doped with alumina, in proportions such as defined above, and preferably consists of a layer of silica doped with alumina.

According to one particular embodiment, the underlayer consists of a layer of $SiO_2$.

It is preferable for the underlayer to be a monolayer. However, the underlayer may be laminated (multilayer), in particular when the underlayer and the underlying coating (or the substrate if the underlayer is deposited directly on the substrate) have a non-negligible refractive index difference.

The ophthalmic lens of the invention may be made antistatic, i.e. such as to not retain and/or develop an appreciable electrostatic charge, by virtue of the incorporation of at least one electrically conductive layer into the stack present on the surface of the ophthalmic lens. This electrically conductive layer is preferably located between two layers of the UV-reflecting interference coating and/or is adjacent to a high-refractive-index layer of this UV-reflecting interference coating. Preferably, the electrically conductive layer is located immediately under a low-refractive-index layer of the UV-reflecting interference coating, and ideally forms the penultimate layer of the UV-reflecting interference coating, i.e. it is located immediately under the silica-based external layer of the UV-reflecting interference coating.

The electrically conductive layer must be sufficiently thin not to decrease the transparency of the UV-reflecting interference coating. The electrically conductive layer is preferably made from an electrically conductive and highly transparent material, generally an optionally doped metal oxide. In this case, its thickness preferably ranges from 1 to 15 nm and more preferably from 1 to 10 nm. The electrically conductive layer preferably comprises an optionally doped metal oxide chosen from indium oxide, tin oxide, zinc oxide and their mixtures. Indium tin oxide (tin-doped indium oxide, $In_2O_3$:Sn), aluminum-doped zinc oxide (ZnO:Al), indium oxide ($In_2O_3$), and tin oxide ($SnO_2$) are preferred. According to one optimal embodiment, the electrically conductive and optically transparent layer is a layer of indium tin oxide (ITO) or a layer of tin oxide.

Generally, the electrically conductive layer contributes, within the stack, but to a limited extent, because of its small thickness, to the obtainment of antireflection properties and forms a high-refractive-index layer in the UV-reflecting interference coating. This is the case for layers made from an electrically conductive and highly transparent material such as layers of ITO.

The various layers of the UV-reflecting interference coating and the optional underlayer are preferably deposited by vacuum deposition using one of the following techniques:
  i) by evaporation and optionally ion-beam-assisted evaporation
  ii) by ion-beam sputtering
  iii) by cathode sputtering
  iv) by plasma-enhanced chemical vapor deposition.

These various techniques are described in the works "Thin Film Processes" and "Thin Film Processes II", edited by Vossen and Kern, Academic Press, 1978 and 1991, respectively. A particularly recommended technique is the vacuum evaporation technique.

Preferably, each of the layers of the UV-reflecting interference coating and the optional underlayer are deposited by vacuum evaporation.

According to one embodiment of the invention, the anti-UV interference coating comprises, in order starting from the substrate, which is optionally coated with one or more functional coatings and an underlayer of 100 to 200 nm thickness, which is preferably made of silica,
  a high-refractive-index layer having a refractive index higher than 1.6 of 15 to 39 nm thickness,
  a low-refractive-index layer having a refractive index lower than 1.55 of 26 to 62 nm thickness,
  a high-refractive-index layer having a refractive index higher than 1.6 of 24 to 63 nm thickness,
  a low-refractive-index layer having a refractive index lower than 1.55 of 52 to 81 nm thickness,
  a high-refractive-index layer having a refractive index higher than 1.6 of 24 to 45 nm thickness,
  a low-refractive-index layer having a refractive index lower than 1.55 of 27 to 64 nm thickness,
  a high-refractive-index layer having a refractive index higher than 1.6 of 28 to 58 nm thickness,
  optionally an electrically conductive layer of 3 to 10 nm thickness, and
  a low-refractive-index layer having a refractive index lower than 1.55 of 84 to 116 nm thickness.

According to another embodiment, the UV-reflecting interference coating comprises, in order starting from the substrate, which is optionally coated with one or more functional coatings and an underlayer of 100 to 200 nm thickness, which is preferably made of silica,
  a high-refractive-index layer having a refractive index higher than 1.6 of 15 to 35 nm thickness,
  a low-refractive-index layer having a refractive index lower than 1.55 of 42 to 62 nm thickness,
  a high-refractive-index layer having a refractive index higher than 1.6 of 24 to 44 nm thickness,
  a low-refractive-index layer having a refractive index lower than 1.55 of 61 to 81 nm thickness,
  a high-refractive-index layer having a refractive index higher than 1.6 of 25 to 45 nm thickness,
  a low-refractive-index layer having a refractive index lower than 1.55 of 27 to 57 nm thickness,
  a high-refractive-index layer having a refractive index higher than 1.6 of 30 to 58 nm thickness,
  optionally an electrically conductive layer of 3 to 10 nm thickness, and a low-refractive-index layer having a refractive index lower than 1.55 of 84 to 114 nm thickness.

According to another embodiment, the UV-reflecting interference coating comprises, in order starting from the substrate, which is optionally coated with one or more functional coatings and an underlayer of 100 to 200 nm thickness, which is preferably made of silica,
  a high-refractive-index layer having a refractive index higher than 1.6 of 19 to 39 nm thickness,
  a low-refractive-index layer having a refractive index lower than 1.55 of 26 to 46 nm thickness,
  a high-refractive-index layer having a refractive index higher than 1.6 of 43 to 63 nm thickness,
  a low-refractive-index layer having a refractive index lower than 1.55 of 52 to 72 nm thickness,
  a high-refractive-index layer having a refractive index higher than 1.6 of 24 to 44 nm thickness,
  a low-refractive-index layer having a refractive index lower than 1.55 of 44 to 64 nm thickness,
  a high-refractive-index layer having a refractive index higher than 1.6 of 28 to 48 nm thickness,
  optionally an electrically conductive layer of 3 to 10 nm thickness, and
  a low-refractive-index layer having a refractive index lower than 1.55 of 95 to 116 nm thickness.

According to one preferred embodiment of the invention, the back face of the ophthalmic lens of the invention is also coated with a conventional antireflection coating that is different from that located on its front face, intended to limit the reflection of UV originating from the sides and/or behind the lens.

Thus, according to one preferred embodiment, the back face of the ophthalmic lens is coated with an antireflection coating such that the reflectance in the UV $R_{uv}$ of said back main face between 280 nm and 380 nm, weighted by the function W($\lambda$), is lower than or equal to 10%, preferably lower than or equal to 5% and ideally lower than or equal to 3%, at an angle of incidence of 35°.

In the context of the invention, the ESPF of an ophthalmic lens is given by the following relationship:

$$ESPF = \frac{100\%}{T_{UV}^{0°}(\%) + R_{UV}^{35°}(\%)}$$

where $T_{UV}^{0°}$(%) is the amount of UV (between 280 and 380 nm) transmitted at an angle of incidence of 0° (i.e. the UV source is perpendicular to the lens), and $R_{UV}^{35°}$(%) is the amount of UV (between 280 nm and 380 nm) reflected at an angle of incidence of 35° from the back face.

The ESPF values calculated according to the formula below are illustrated in the following table, for back-face Ruv values lower than 5%, for various front-face Ruv values and for the material ORMA®:

TABLE 3

| ESPF Ruv@35° back | (1-Ruv)@0° front face on ORMA® | | | | | |
|---|---|---|---|---|---|---|
| side | 1 | 0.65 | 0.5 | 0.35 | 0.2 | 0 |
| 0.05 | 11.27 | 13.31 | 14.42 | *15.74* | *17.32* | 20.00 |
| 0.04 | 12.71 | *15.35* | *16.85* | *18.68* | 20.95 | 25.00 |
| 0.03 | 14.56 | *18.13* | 20.26 | 22.96 | 26.50 | 33.33 |
| 0.02 | *17.04* | 22.15 | 25.41 | 29.81 | 36.05 | 50.00 |
| 0.01 | 20.53 | 28.45 | 34.07 | 42.47 | 56.37 | 100.00 |

The cells with italic text correspond to an ESPF of 15 to 20 and the cells with bold text correspond to an ESPF higher than 20.

Thus, the ophthalmic lens comprising the UV-reflecting interference coating according to the invention and an antireflection coating for the UV (i.e. a coating such as mentioned above) on its back face has an excellent ESPF index.

Preferably, the ESPF coefficient of the ophthalmic lens according to the invention is higher than 10, preferably higher than 15 and ideally higher than 20.

It is however possible to apply a UV-reflecting interference coating such as described in the present application to the back face of the ophthalmic lens. The UV-reflecting multilayer interference coatings of the front face and the back face may then be identical or different.

According to one embodiment of the invention, the back face of the ophthalmic lens is not coated with a UV-reflecting multilayer interference coating according to the invention.

The UV-reflecting interference coating may be deposited directly on a bare substrate.

In some applications, it is preferable for the main face of the substrate to be coated with one or more functional coatings prior to the deposition of the UV-reflecting interference coating of the invention.

These functional coatings, which are conventionally used in optics, may, nonlimitingly, be: an anti-shock primer layer, an anti-abrasion and/or anti-scratch coating, a polarized coating, a photochromic coating or a tinted coating.

Preferably, the ophthalmic lens comprises no photochromic coating and/or comprises no photochromic substrate.

Generally, the front main face of the substrate i.e. the face on which a UV-reflecting interference coating will be deposited, is coated with an anti-shock primer layer, with an anti-abrasion and/or anti-scratch coating, or with an anti-shock primer layer coated with an anti-abrasion and/or anti-scratch coating.

The UV-reflecting interference coating of the invention is preferably deposited on an anti-abrasion and/or anti-scratch coating. The anti-abrasion and/or anti-scratch coating may be any layer conventionally used as an anti-abrasion and/or anti-scratch coating in the field of ophthalmic lenses.

The abrasion-resistant and/or to scratch-resistant coatings are preferably hard coatings based on poly(meth)acrylates or on silanes generally comprising one or more mineral fillers intended to increase the hardness and/or the refractive index of the coating once cured.

Hard anti-abrasion and/or anti-scratch coatings are preferably prepared from compositions comprising at least one alkoxysilane and/or a hydrolyzate of the latter, for example obtained by hydrolysis with a hydrochloric acid solution and optionally condensation and/or curing catalysts.

Mention may be made, among the coatings recommended in the present invention, of coatings based on epoxysilane hydrolyzates, such as those described in the patents FR 2702486 (EP 0614957), U.S. Pat. Nos. 4,211,823 and 5,015,523.

A preferred composition for an anti-abrasion and/or anti-scratch coating is that disclosed in the patent FR 2 702 486 on behalf of the applicant. It comprises an epoxytrialkoxysilane and dialkyldialkoxysilane hydrolyzate, colloidal silica and a catalytic amount of aluminum-based curing catalyst, such as aluminum acetylacetonate, the remainder being essentially composed of solvents conventionally used for the formulation of such compositions. Preferably, the hydrolyzate used is a hydrolyzate of y-glycidoxypropyltrimethoxysilane (GLYMO) and dimethyldiethoxysilane (DMDES).

The anti-abrasion and/or anti-scratch coating composition may be deposited on the main face of the substrate by dip coating or spin coating. It is subsequently cured by the appropriate route (preferably thermal or UV).

The thickness of the anti-abrasion and/or anti-scratch coating generally varies from 2 to 10 μm, preferably from 3 to 5 μm.

It is possible, prior to the deposition of the anti-abrasion and/or anti-scratch coating, to deposit, on the substrate, a primer coating which improves the impact resistance and/or the adhesion of the subsequent layers in the final product. This coating can be any impact-resistant primer layer conventionally used for articles made of transparent polymeric material, such as ophthalmic lenses.

Mention may be made, among preferred primer compositions, of compositions based on thermoplastic polyurethanes, such as those described in the Japanese patents JP 63-141001 and JP 63-87223, poly(meth)acrylic primer compositions, such as those described in the patent U.S. Pat. No. 5,015,523, compositions based on thermosetting polyurethanes, such as those described in the patent EP 0 404 111, and compositions based on poly(meth)acrylic latexes or on latexes of polyurethane type, such as those described in the patents U.S. Pat. No. 5,316,791 and EP 0 680 492.

Preferred primer compositions are polyurethane-based compositions and latex-based compositions, in particular polyurethane latexes optionally containing polyester units.

Among commercially available primer compositions suitable for the invention, mention may be made of the following: Witcobond® 232, Witcobond® 234, Witcobond® 240, Witcobond® 242, Neorez® R-962, Neorez® R-972, Neorez® R-986 and Neorez® R-9603.

It is also possible to use in the primer compositions blends of these latexes, in particular of polyurethane latex and poly(meth)acrylic latex.

These primer compositions may be deposited on the faces of the article by dip coating or spin coating then dried at a temperature of at least 70° C. and possibly of as a high as 100° C. and preferably of about 90° C., for a time of 2 minutes to 2 hours and generally of about 15 minutes, in order to form primer layers having thicknesses, post-bake, of 0.2 to 2.5 µm and preferably from 0.5 to 1.5 µm.

The ophthalmic lens according to the invention may also comprise coatings, formed on the UV-reflecting interference coating and capable of modifying its surface properties, such as hydrophobic coatings and/or oleophobic coatings (anti-smudge top coat). These coatings are preferably deposited on the external layer of the UV-reflecting interference coating. They are generally less than or equal to 10 nm in thickness, preferably from 1 to 10 nm in thickness and better still from 1 to 5 nm in thickness.

It is generally a question of fluorosilane or fluorosilazane coatings. They may be obtained by depositing a fluorosilane or fluorosilazane precursor preferably comprising at least two hydrolysable groups per molecule. The fluorosilane precursors preferably contain fluoropolyether groups and better still perfluoropolyether groups. These fluorosilanes are well known and are described, inter alia in U.S. Pat. Nos. 5,081,192, 5,763,061, 6,183,872, 5,739,639, 5,922,787, 6,337,235, 6,277,485 and EP 0933377.

One preferred hydrophobic and/or oleophobic coating composition is sold by Shin-Etsu Chemical under the denomination KP 801 M®. Another preferred hydrophobic and/or oleophobic coating composition is sold by Daikin Industries under the denomination OPTOOL DSX®. It is a question of a fluororesin comprising perfluoropropylene groups.

Typically, an ophthalmic lens according to the invention comprises a substrate coated in succession on its front face with an anti-shock primer layer, with an anti-abrasion and/or anti-scratch layer, with an anti-UV multilayer interference coating according to the invention, and with a hydrophobic and/or oleophobic coating. The ophthalmic lens according to the invention is preferably an ophthalmic lens for a pair of spectacles (spectacle lenses), or an ophthalmic lens blank. The lens may be a polarized lens, a photochromic lens, or a tinted sunglass lens, optionally providing a correction.

The back face of the ophthalmic lens substrate may be coated in succession with an anti-shock primer layer, with an anti-abrasion and/or anti-scratch layer, with an antireflection coating that may or may not be an anti-UV multilayer interference coating according to the invention, and with a hydrophobic and/or oleophobic coating.

According to one embodiment, the ophthalmic lens according to the invention does not absorb in the visible or absorbs little in the visible, this meaning, in the context of the present application, that its transmittance $\tau_v$ in the visible (also called relative transmittance in the visible) is higher than 90%, better still higher than 95%, even better still higher than 96% and optimally higher than 97%. The transmittance TV respects a standardized international definition (standard ISO 13666:1998) and is measured according to standard ISO 8980-3. It is defined in the wavelength range extending from 380 to 780 nm.

Preferably, the light absorption of the coated ophthalmic lens according to the invention is lower than or equal to 1%.

Furthermore, the ophthalmic lens according to the invention is advantageously used as a component of a pair of spectacles. Thus, the invention also provides a pair of spectacles comprising at least one ophthalmic lens according to the invention.

Lastly, the present invention relates to a process for manufacturing an ophthalmic lens such as described above, characterized in that the UV-reflecting interference coating is vacuum deposited.

In particular, the UV-reflecting interference coating is vacuum deposited using one of the following techniques:

i) by evaporation and optionally ion-beam-assisted evaporation
ii) by ion-beam sputtering
iii) by cathode sputtering
iv) by plasma-enhanced chemical vapor deposition.

These various techniques are described in the works "Thin Film Processes" and "Thin Film Processes II", edited by Vossen and Kern, Academic Press, 1978 and 1991, respectively. A particularly recommended technique is the vacuum evaporation technique.

EXAMPLES

1. General Procedures

The ophthalmic lenses employed in the examples comprise an ESSILOR ORMA® lens substrate 30 of 65 mm diameter, of refractive index of 1.50, of −2.00 diopter power and of 1.2 mm thickness, coated on its back face with the anti-abrasion and anti-scratch coating (hard coat) disclosed in example 3 of patent EP 0614957 (of refractive index equal to 1.47 and of 3.5 µm thickness), based on a hydrolyzate of GLYMO and DMDES, colloidal silica and aluminum acetylacetonate, then an antireflection multilayer interference coating according to the invention.

Said anti-abrasion and anti-scratch coating was obtained by deposition and curing of a composition comprising, by weight, 224 parts of GLYMO, 80.5 parts of 0.1N HCl, 120 parts of DMDES, 718 parts of 30% by weight colloidal silica in methanol, 15 parts aluminum acetylacetonate and 44 parts of ethyl cellosolve. The composition also comprises 0.1% of FLUORAD™ FC-430® surfactant from 3M, by weight relative to the total weight of the composition.

The layers of the antireflection coating were deposited without heating of the substrates by vacuum evaporation (evaporation source: the electron gun).

The deposition tool was a Satis 1200DLF machine equipped with a Temescal (8 kV) electron gun for the evaporation of the oxides, and a (Veeco Mark II) ion gun for the preliminary phase of preparing the surface of the substrate with argon ions (IPC).

The thickness of the layers was controlled by means of a quartz microbalance. The spectral measurements were carried out using a variable-incidence Perkin-Elmer lambda 850 spectrophotometer with a universal reflectance accessory (URA).

2. Procedure

The process used to prepare the ophthalmic lenses comprised introducing the substrate coated on its front face with the anti-abrasion and anti-scratch coating into a vacuum deposition chamber, a step of pumping the chamber down until a secondary vacuum was obtained, a step of activating the surface of the substrate with a beam of argon ions, stopping the ionic irradiation, forming the underlayer and then the various layers of the antireflection coating on the anti-abrasion and anti-scratch coating by successive evaporations and lastly a venting step.

3. Tested Compositions

The structural characteristics and the optical properties of ophthalmic lenses 1 to 3 obtained according to examples 1 to 3 are detailed below. The underlayer has been shown in bold, italic text. The thin ITO layer provides the lens with an antistatic functionality. Its optical index is close to that of $ZrO_2$. The ITO layer and the $ZrO_2$ layer are therefore considered to form one high-refractive-index layer.

The values of the average reflectances in the UV and in the visible are those of the front face and are indicated for an angle of incidence of 0° (measurements carried out according to standard ISO8980-4).

TABLE 4

|  | Refractive index | Lens 1 Example 1 (physical thickness) | Lens 2 Example 2 (physical thickness) | Lens 3 Example 3 (physical thickness) |
|---|---|---|---|---|
| Air | 1 |  |  |  |
| $SiO_2$ | 1.47256 | 94 nm | 105 nm | 106 nm |
| ITO | 2.0592 | 6.5 nm | 6.5 nm | 6.5 nm |
| $ZrO_2$ | 1.997 | 48 nm | 38 nm | 38 nm |
| $SiO_2$ | 1.47256 | 37 nm | 54 nm | 51 nm |
| $ZrO_2$ | 1.997 | 35 nm | 34 nm | 35 nm |
| $SiO_2$ | 1.47256 | 71 nm | 62 nm | 69 nm |
| $ZrO_2$ | 1.997 | 34 nm | 53 nm | 37 nm |
| $SiO_2$ | 1.47256 | 52 nm | 36 nm | 53 nm |
| $ZrO_2$ | 1.997 | 25 nm | 29 nm | 19 nm |
| $SiO_2$ underlayer | 1.4636 | 150 nm | 150 nm | 150.0 nm |
| Substrate |  |  | 2 mm |  |
| Properties |  |  |  |  |
| C* |  | 9 | 9 | 9 |
| h |  | 145 | 135 | 135 |
| Rv |  | 0.70% | 0.88% | 0.85% |
| Average reflectance [280 nm-380 nm] |  | 65.4% | 67.7% | 69.5% |
| Average reflectance [350 nm-380 nm] |  | 43% | 62% | 57% |
| Average reflectance [350 nm-400 nm] |  | 35% | 53% | 48% |
| Tuv* [280 nm-380 nm] |  | 1.34% | 1.25% | 1.18% |

*Tuv = Tuv(bare Orma)(1 − Ruv) = 3.87% (1 − Ruv)

Figure 2:
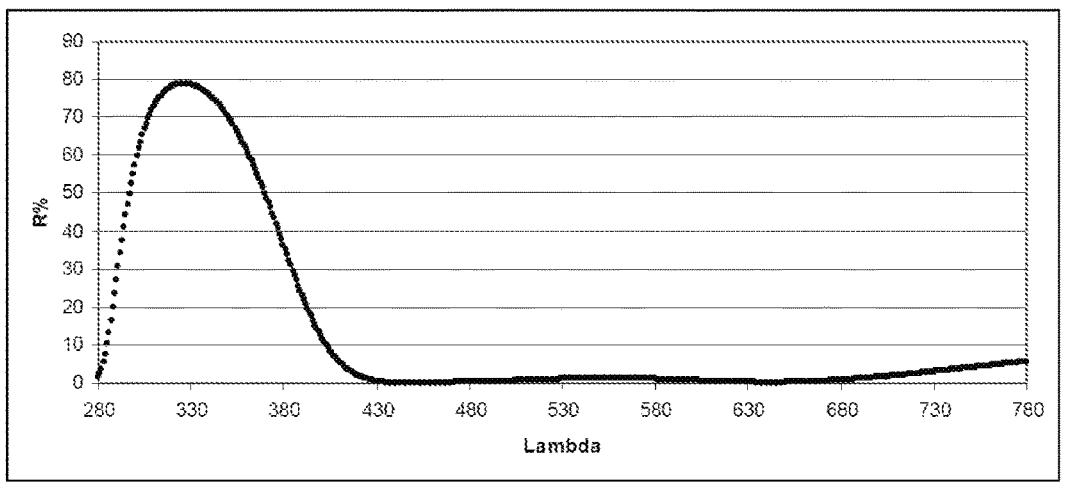

Graphs of the reflectance between 280 and 780 nm of certain of the prepared articles (lens 1 and lens 3) have been shown in FIGS. 1 and 2 for an angle of incidence of 0°.

4. Results:

It may be seen that ophthalmic lenses 1 to 3 possess very good antireflection properties in the visible domain (Rv<0.88%) while decreasing transmission in the UV (Tuv<1.34%) and while having an excellent average reflectance in the UV: higher than 65% in the domain [280 nm-380 nm] and in particular higher than 57% in the domain extending from 350 nm to 380 nm, which is the most problematic for the substrate Orma®.

The lenses of examples 1 to 3 furthermore have excellent properties as regards transparency, a good abrasion and scratch resistance and a good resistance to being dipped in hot water followed by a mechanical surface solicitation. The adherence of the coatings to the substrate is also very satisfactory.

5. Comparative Trials

TABLE 5

|  | Reflectance at 400 nm | Rv | Average reflectance [280 nm-380 nm] | Average reflectance [350 nm-380 nm] | Average reflectance [350 nm-400 nm] |
|---|---|---|---|---|---|
| Ex 3 of US5332618 | 46.4% | 0.40% | 57% | 86% | 81% |
| Example 1 | 2.3% | 0.70% | 65.4% | 43% | 35% |
| Example 2 | 14.5% | 0.88% | 67.7% | 62% | 53% |
| Example 3 | 12.5% | 0.85% | 69.5% | 57% | 48% |

As may be seen, ophthalmic lenses according to the invention allow substantial reflection of UV rays (here, at normal incidence), in particular in the problematic range of 350 to 380 nm (lenses 2 and 3), while having a low light reflectance at 400 nm.

6. SPF Values of the Lens

The lenses obtained according to examples 1 to 3 may be coated, on their back face, with an antireflection coating of Ruv between 280 and 380 nm lower than 5% at an angle of incidence of 35°. With the coating of example 1 of patent FR2968774, the ESPF values are higher than 20 (table 6):

TABLE 6

|  | Tuv@0° on ORMA (Tuv = 3.87%(1-Ruv)) | Ruv@35° back face | ESPF |
|---|---|---|---|
| Example 1 | 1.34% | 3% | 23 |
| Example 2 | 1.25% | 3% | 23.5 |
| Example 3 | 1.18% | 3% | 24 |

Although the invention has been described with regard to a plurality of particular embodiments, it is of course obvious that it is in no way limited thereto and that it comprises all techniques equivalent to the means described and their combinations if these are encompassed within the scope of the invention.

The invention claimed is:

1. A transparent ophthalmic lens comprising a substrate having a front main face and a back main face, said front main face being coated with a multilayer interference coating comprising a stack of at least one layer having a refractive index higher than 1.6, called the high-refractive-index layer, and of at least one layer having a refractive index lower than 1.55, called the low-refractive-index layer, and which does not contain titanium, wherein:
   the average reflectance of said coated front main face of said interference coating, between 350 nm and a wavelength comprised between 380 and 400 nm, weighted by the function W(λ), is higher than or equal to 50% at at least one angle of incidence comprised between 0° and 17°; and
   the light reflectance at 400 nm of said coated front main face of said interference coating is lower than or equal to 35% at at least one angle of incidence comprised between 0° and 17°.

2. The ophthalmic lens of claim 1, wherein said multilayer interference coating is an antireflection coating.

3. The ophthalmic lens of claim 1, wherein the average reflectance of said coated front main face of said interference coating, between 350 nm and a wavelength comprised between 350 and 380 nm, weighted by the function W(λ), is higher than or equal to 50% at at least one angle of incidence comprised between 0° and 17°.

4. The ophthalmic lens of claim 1, wherein said average reflectance of said front main face between 350 nm and a wavelength comprised between 380 and 400 nm is higher than or equal to 65% at at least one angle of incidence comprised between 0° and 17°.

5. The ophthalmic lens of claim 1, wherein the light reflectance at 400 nm of said coated front main face of said interference coating is lower than or equal to 25% at at least one angle of incidence comprised between 0° and 17°.

6. The ophthalmic lens of claim 5, wherein the light reflectance at 400 nm of said coated front main face of said interference coating is lower than or equal to 15% at at least one angle of incidence comprised between 0° and 17°.

7. The ophthalmic lens of claim 1, wherein said multilayer interference coating comprises a number of layers higher than or equal to 3 and a number of layers lower than or equal to 10.

8. The ophthalmic lens of claim 7, wherein said multilayer interference coating comprises a number of layers higher than or equal to 4 and a number of layers lower than or equal to 8.

9. The ophthalmic lens of claim 8, wherein said multilayer interference coating comprises a number of layers higher than or equal to 6 and a number of layers lower than or equal to 8.

10. The ophthalmic lens of claim 1, wherein the one or more high-refractive-index layers of the multilayer interference coating have a refractive index higher than or equal to 1.8.

11. The ophthalmic lens of claim 10, wherein the one or more high-refractive-index layers of the multilayer interference coating have a refractive index higher than or equal to 1.9.

12. The ophthalmic lens of claim 1, wherein the light reflected from said coated front main face of said interference coating has a chroma C* lower than or equal to 15 at at least one angle of incidence comprised between 0° and 17°.

13. The ophthalmic lens of claim 12, wherein the light reflected from said coated front main face of said interference coating has a chroma C* lower than or equal to 10 at at least one angle of incidence comprised between 0° and 17°.

14. The ophthalmic lens of claim 1, wherein the substrate has a transmittance T higher than or equal to 1% at a wavelength located between 350 nm and 400 nm.

15. The ophthalmic lens of claim 1, wherein the reflectance in the visible Rv between 380 nm and 780 nm of said coated front main face of said interference coating is lower than or equal to 3%.

16. The ophthalmic lens of claim 15, wherein the reflectance in the visible Rv between 380 nm and 780 nm of said coated front main face of said interference coating is lower than or equal to 1.5%.

17. The ophthalmic lens of claim 1, wherein the interference coating comprises, in order starting from the substrate:
a high-refractive-index layer having a refractive index higher than 1.6 of 15 to 39 nm thickness;
a low-refractive-index layer having a refractive index lower than 1.55 of 26 to 62 nm thickness;
a high-refractive-index layer having a refractive index higher than 1.6 of 24 to 63 nm thickness;
a low-refractive-index layer having a refractive index lower than 1.55 of 52 to 81 nm thickness;
a high-refractive-index layer having a refractive index higher than 1.6 of 24 to 45 nm thickness;
a low-refractive-index layer having a refractive index lower than 1.55 of 27 to 64 nm thickness;
a high-refractive-index layer having a refractive index higher than 1.6 of 28 to 58 nm thickness;
a low-refractive-index layer having a refractive index lower than 1.55 of 84 to 116 nm thickness.

18. The ophthalmic lens of claim 17, wherein the interference coating comprises, in order starting from the substrate:
a high-refractive-index layer having a refractive index higher than 1.6 of 15 to 35 nm thickness;
a low-refractive-index layer having a refractive index lower than 1.55 of 42 to 62 nm thickness;
a high-refractive-index layer having a refractive index higher than 1.6 of 24 to 44 nm thickness;
a low-refractive-index layer having a refractive index lower than 1.55 of 61 to 81 nm thickness;
a high-refractive-index layer having a refractive index higher than 1.6 of 25 to 45 nm thickness;
a low-refractive-index layer having a refractive index lower than 1.55 of 27 to 57 nm thickness;
a high-refractive-index layer having a refractive index higher than 1.6 of 30 to 58 nm thickness;
a low-refractive-index layer having a refractive index lower than 1.55 of 84 to 114 nm thickness.

19. The ophthalmic lens of claim 18, wherein the interference coating further comprises an electrically conductive layer of 3 to 10 nm thickness between the a high-refractive-index layer having a refractive index higher than 1.6 of 30 to 58 nm thickness and the low-refractive-index layer having a refractive index lower than 1.55 of 84 to 114 nm thickness.

20. The ophthalmic lens of claim 17, wherein the interference coating comprises, in order starting from the substrate:
a high-refractive-index layer having a refractive index higher than 1.6 of 19 to 39 nm thickness;
a low-refractive-index layer having a refractive index lower than 1.55 of 26 to 46 nm thickness;
a high-refractive-index layer having a refractive index higher than 1.6 of 43 to 63 nm thickness;
a low-refractive-index layer having a refractive index lower than 1.55 of 52 to 72 nm thickness;
a high-refractive-index layer having a refractive index higher than 1.6 of 24 to 44 nm thickness;
a low-refractive-index layer having a refractive index lower than 1.55 of 44 to 64 nm thickness;
a high-refractive-index layer having a refractive index higher than 1.6 of 28 to 48 nm thickness;
a low-refractive-index layer having a refractive index lower than 1.55 of 95 to 116 nm thickness.

21. The ophthalmic lens of claim 20, wherein the interference coating further comprises an electrically conductive layer of 3 to 10 nm thickness between the high-refractive-index layer having a refractive index higher than 1.6 of 28 to 48 nm thickness and the low-refractive-index layer having a refractive index lower than 1.55 of 95 to 116 nm thickness.

22. The ophthalmic lens of claim 17, wherein the interference coating further comprises an electrically conductive layer of 3 to 10 nm thickness between the high-refractive-index layer having a refractive index higher than 1.6 of 28 to 58 nm thickness and the low-refractive-index layer having a refractive index lower than 1.55 of 84 to 116 nm thickness.

23. The ophthalmic lens of claim 1, wherein the reflectance in the UV $R_{uv}$, of said back main face between 280 nm and 380 nm, weighted by the function W(λ), is lower than or equal to 10% at an angle of incidence of 35°.

24. The ophthalmic lens of claim 23, wherein the reflectance in the UV $R_{uv}$, of said back main face between 280 nm and 380 nm, weighted by the function W(λ), is lower than or equal to 5% at an angle of incidence of 35°.

25. The ophthalmic lens of claim 1, wherein the ESPF coefficient of the lens is higher than 10.

26. A process for manufacturing an ophthalmic lens of claim 1, wherein the multilayer interference coating is vacuum deposited.

* * * * *